(12) United States Patent
Rasmussen et al.

(10) Patent No.: US 8,173,026 B2
(45) Date of Patent: **\*May 8, 2012**

(54) PRESSURIZED WATER EVAPORATION SYSTEM AND METHOD OF EVAPORATING WATER

(75) Inventors: Rodney Rasmussen, Salt Lake City, UT (US); Paul C. Cox, Salt Lake City, UT (US)

(73) Assignee: ReformWater, LLC, Salt Lake City, UT (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/404,071

(22) Filed: Mar. 13, 2009

(65) Prior Publication Data

US 2010/0230831 A1    Sep. 16, 2010

(51) Int. Cl.
*B01D 37/00* (2006.01)
(52) U.S. Cl. ............. 210/767; 159/3; 159/4.4; 159/48.1
(58) Field of Classification Search ............... 159/3, 4.4, 159/48.1; 210/767
See application file for complete search history.

(56) References Cited

U.S. PATENT DOCUMENTS

| | | | | |
|---|---|---|---|---|
| 2,904,263 | A | * | 9/1959 | Tate et al. ............... 239/494 |
| 4,323,424 | A | * | 4/1982 | Secunda et al. ............ 159/48.1 |
| 5,082,525 | A | | 1/1992 | Travis |
| 5,240,560 | A | | 8/1993 | Gregory |
| 5,335,728 | A | | 8/1994 | Strahan |
| 5,381,742 | A | | 1/1995 | Linton et al. |
| 5,582,680 | A | | 12/1996 | Vankouwenberg et al. |
| 6,190,498 | B1 | | 2/2001 | Blagborne |
| 6,200,428 | B1 | | 3/2001 | VanKouwenberg |
| 6,637,379 | B2 | | 10/2003 | Hays et al. |
| 7,251,939 | B2 | | 8/2007 | Walker |
| 2007/0227674 | A1 | | 10/2007 | Haslem et al. |
| 2007/0235146 | A1 | | 10/2007 | Haslem et al. |
| 2007/0246414 | A1 | | 10/2007 | Page et al. |

FOREIGN PATENT DOCUMENTS

| | | |
|---|---|---|
| JP | 6218357 | 8/1994 |
| JP | 7088469 | 4/1995 |
| JP | 2006007097 | 1/2006 |

OTHER PUBLICATIONS

CAC Product website. "High Output Quick Release Fittings". 2008. <http://www.compressedaircentre.ie/index.php?cPath=24>.*
Declaration of J. Keith Reidhead and Tyson P. Cox; May 13, 2009.

\* cited by examiner

*Primary Examiner* — Yelena G Gakh
*Assistant Examiner* — David Weisz
(74) *Attorney, Agent, or Firm* — Workman Nydegger

(57) ABSTRACT

Pressurized water evaporation systems and methods are used to evaporate large quantities of water from water impoundment ponds or other waste water sources. Water evaporation systems include one or more water evaporation barrels having an air acceleration chamber, water atomization chamber, and pressurizable air and water lines in fluid communication with the barrel. Fast moving air and water create fine water droplets within the water atomization chamber of each barrel. A fine spray or mist of tiny water droplets is emitted from a discharge nozzle of each barrel. Water evaporation systems and methods can be used to efficiently evaporate waster water produced by a wide variety of industrial processes, including waste water produced at oil or gas wells.

20 Claims, 12 Drawing Sheets

PRESSURIZED WATER EVAPORATION SYSTEM AND METHOD OF EVAPORATING WATER

BACKGROUND OF THE INVENTION

1. The Field of the Invention

Figure 1A:
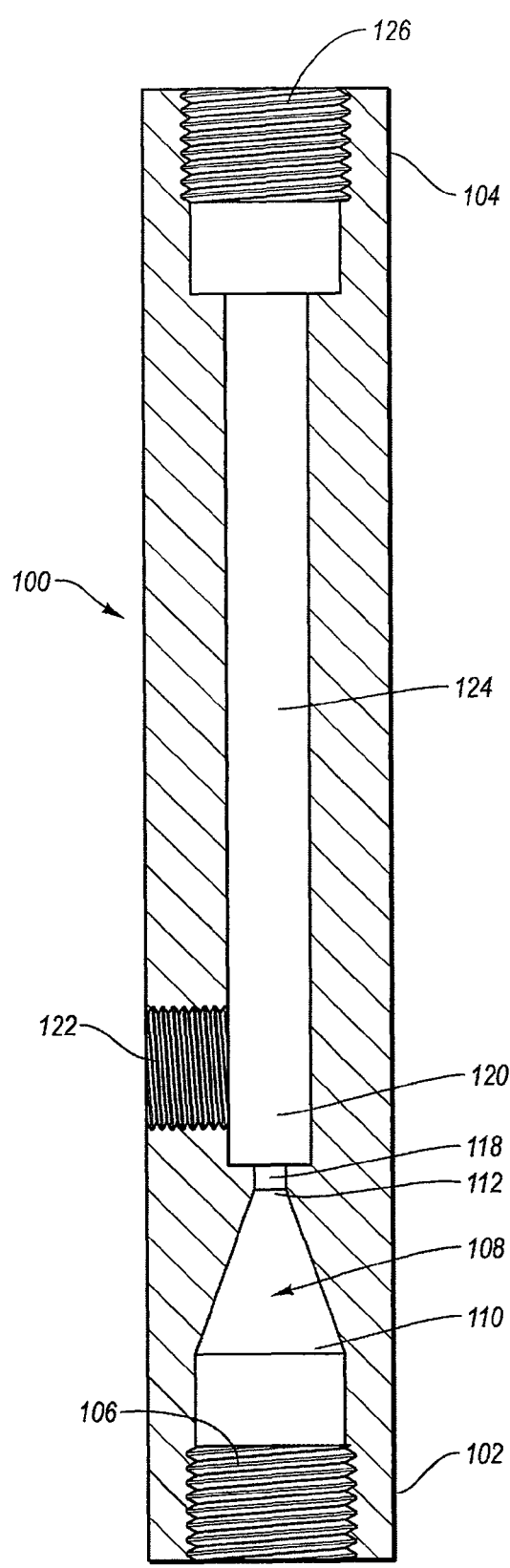

The present invention relates to water evaporation systems, more particularly to pressurized water evaporation systems for large-scale evaporation of waste water from impoundment ponds and other industrial sources.

2. The Relevant Technology

There are many industrial processes which produce large quantities of water that cannot be legally discharged into rivers, other bodies of water, or onto the ground but must be impounded in evaporation ponds. Examples include waste water produced during the drilling of oil and gas wells, as a byproduct of extracting oil and gas (e.g., natural subsurface water or injected water), farm runoff (e.g., crop irrigation runoff, such as in the Imperial Valley in California, hog farm runoff, cattle farm runoff, and winery waste water), mine tailings wash runoff, mine process waste water (e.g., from gold mining, which water includes cyanide salts and acids), food processing waste water, sewage water, mineral reclamation evaporation ponds (e.g., to recover potash, soda ash, gypsum, magnesium and salt), and waste water discharged from mineral reclamation (e.g., alkaline water in trona ponds resulting from mining soda ash).

Waste water is produced in large quantities during drilling and extraction of natural gas and petroleum. Water is often used during well drilling, which produces contaminated waste water that must be impounded. Petroleum and gas reservoirs often contain edge water, which is natural subterranean water located near the hydrocarbon being extracted. In addition, many producers inject water into the ground (e.g., as a peripheral water drive) in order to drive the oil or gas toward producing wells within the periphery of water injectors. The amount of water extracted as a byproduct of gas or oil production is a fraction of the water cut. The water cut produced from oil and gas wells is typically separated from the oil or gas near the well head and stored in a holding tank. Because the water contains contaminants, it is typically hauled to a licensed impoundment facility for disposal in a lined evaporation pond.

Because evaporation of pond water is generally passive, impoundment ponds are typically very large, sometimes covering up to 50 acres or more to increase the rate of evaporation. The waste water contained in such ponds is often toxic. For these and other reasons, waste water evaporation ponds must generally be placed at remote locations, away from cities, roads, parks and other places where people are likely to congregate. Moreover, industrial waste water impoundments can attract and kill migratory birds and other wildlife. As a result, many locales ban the construction of large water impoundment ponds for environmental and/or safety reasons. For example, water produced at oil and gas wells in Colorado is often shipped to other locations for disposal, such as Utah, at a cost of about $10 to $12 for each barrel of water. About 100,000 barrels of waste water are currently shipped daily from Colorado to Utah, at a total cost of $1,000,000 or more per day.

BRIEF SUMMARY OF THE INVENTION

The present invention relates to pressurized water evaporation systems and methods for evaporating large quantities of waste water. Examples of waste water sources include sources discussed above including, but not limited to, water produced during the drilling and extraction of oil and gas, farm runoff, mine tailings runoff, mine process water, food processing water, sewage, and water from mineral reclamation. The inventive pressurized water evaporation systems and methods are able to process waste water using pressurized water and air to convert the water into fine water droplets, which are emitted into the air to promote evaporation.

According to one aspect of the invention, a pressurized water evaporation system is provided which comprises a pressurizable water line, a pressurizable air line, and a water evaporation device which includes a barrel having a hollow interior, an air input orifice at a receiving end for receiving pressurized air from the pressurizable air line, an air acceleration chamber that receives and accelerates pressurized air through the barrel, a water input orifice for receiving pressurized water from the pressurizable water line, an initial mixing chamber into which the accelerated air and pressurized water enter and make initial contact, a water atomization chamber within which the pressurized air and water rapidly mix so as to form fine droplets of water, and a discharge orifice at a discharge end of the barrel through which air and fine water droplets are discharged. A spray nozzle or emitter may be attached at the discharge end of the barrel in order to emit a fine spray or cloud of water droplets above the water evaporation device. According to one embodiment, the emitter may comprise a spiral cone nozzle that is threadably coupled to the discharge orifice of the barrel.

The water evaporation device further includes means for releasably connecting the receiving end of the barrel to the pressurizable air line. An example includes threads within the air input orifice configured to be threadably attached to a threaded nipple or pipe attached to the pressurizable air line. Another example is a quick release coupler, such as quick release couplers known in the art for interconnecting pressurized air conduits or hoses.

The water evaporation device further includes means for releasably connecting the barrel to the pressurizable water line. An example includes threads within the water input orifice configured to be threadably attached to a threaded nipple, pipe or tubing attached to the pressurizable water line. Another example is a quick release coupler, such as quick release couplers known in the art for interconnecting pressurized water conduits or hoses.

The air acceleration chamber of the barrel has a tapering diameter, moving from an input end to an exit end distal to the air input orifice, such that the air acceleration chamber at the exit end has a diameter that is substantially less than the diameter at the input end. The constricted air passageway causes air within the air acceleration chamber to speed up. In one embodiment, the air acceleration chamber can have a frustoconical cross section extending between the input end and exit end. Alternatively, the air acceleration chamber can have a bell-shaped cross section extending between the input end and exit end. In yet another embodiment, the air acceleration chamber can have a stepped cross section. It will be appreciated that the air acceleration chamber can have other cross sectional designs or features so long as there is a constriction that accelerates pressurized air passing therethrough. The barrel may further include an air discharge passageway extending between the exit end of the air acceleration chamber and the initial mixing chamber.

The initial mixing chamber can have a diameter that is significantly greater than the diameter of the exit end of the air acceleration chamber. This provides room for initial mixing of the pressurized air and pressurized water. In addition, fast moving air passing from the air acceleration chamber into the initial mixing chamber can create a venturi effect, creating suction or negative pressure, that facilitates mixing of the pressurized air and water within the initial mixing chamber. From there, the initial pressurized air and water mixture passes into the water atomization chamber. The atomization chamber generally has a diameter similar to that of the initial mixing chamber. The pressurized air and water rapidly intermix and churn within the atomization chamber so as to form fine water droplets, which are emitted through the discharge end of the barrel as a fine spray or cloudy mist of water.

According to another aspect of the invention, a water evaporation system for use in evaporating water from a waste water source is provided that comprises means for providing pressurized water, means for providing pressurized air, and a water evaporation device that includes a barrel having a hollow interior, first coupling means for releasably attaching an input end of the barrel to a pressurized air line or other means for providing pressurized air, air acceleration means for accelerating air received into the barrel through the input end, a water input orifice, second coupling means for releasably attaching a pressurized water line or other means for providing pressurized water to the water input orifice, and water atomization means for mixing water and air passing through the hollow interior of the barrel so as to form fine droplets of water. The system may also include spray means for directing fine droplets of water from the barrel into the air.

In another aspect of the invention, a method of evaporating pressurized water from a source of waste water is provided, such as water pumped from an impoundment pond, water storage tank, or direct line from a source of industrial waste water. The method includes positioning a water evaporation system in fluid communication with a source of pressurized waste water and pressurized air, passing pressurized air through the pressurizable air line and pressurized water through the pressurizable water line into each water evaporation device of the water evaporation system, mixing the pressurized air and water together within the barrel of each water evaporation device, atomizing the water within the atomization chamber of each water evaporation device, such as by mixing and churning of the pressurized air and water within the atomization chamber, and discharging a cloud or spray of fine water droplets out the distal discharge end of each water evaporation device.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1A is a cross-sectional view of an exemplary water evaporation device for use with pressurized water evaporation systems according to the invention;

FIG. 1B is a side perspective view of the exemplary water evaporation device of FIG. 1A;

FIG. 1C is a perspective view of an exemplary water evaporation system including pressurizable water and air lines connected to the water evaporation device of FIGS. 1A and 1B and shown emitting a fine spray of water;

FIG. 2 is a cross-sectional view of another exemplary water evaporation device according to the invention;

FIG. 3A illustrates an exemplary pressurized water evaporation system including multiple water evaporation devices aligned in a single row along pressurizable air and water lines;

FIG. 3B illustrates an exemplary pressurized water evaporation system in which a pair of water evaporation devices connected to pressurizable air and water lines are angled relative to each other and disposed on opposite sides of the pressurizable air line;

FIG. 3C illustrates an exemplary pressurized water evaporation system in which three water evaporation devices are connected to a pressurizable air line at different angles;

FIG. 4 illustrates an exemplary pressurized water evaporation system designed to float on top of an impoundment pond and which includes a pressurizable water line and a branched pressurizable air line with multiple water evaporation devices attached in staggered fashion alone each air line branch;

FIG. 5 illustrates another exemplary pressurized water evaporation system including a pressurizable air line to which multiple water evaporation devices are attached in staggered fashion and a pair of pressurizable water lines positioned so as feed pressurized water to corresponding staggered water evaporation devices;

FIG. 6 illustrates an exemplary branched pressurized water evaporation system for use in evaporating water over a large area;

FIG. 7 illustrates a multiply branched pressurized water evaporation system for use in evaporating water over an even larger area;

FIG. 8A is an aerial view of an exemplary water evaporation pond that includes the multiply branched pressurized water evaporation system of FIG. 7;

FIG. 8B is a cross-sectional elevation view of the exemplary water evaporation pond of FIG. 8A; and FIG. 9 illustrates another pressurized water evaporation system that includes multiple concentric rings of pressurizable air lines, pressurizable water lines, and water evaporation devices.

DETAILED DESCRIPTION OF THE PREFERRED EMBODIMENTS

The present invention relates to pressurized water evaporation systems and methods for evaporating water from a waste water source. Although the water evaporation, systems and methods can be employed in a variety of different situations where it is desirable to evaporate a large quantity of water into the atmosphere, such as water from most any impoundment pond, the present invention is especially well suited for evaporating waste water generated by the oil and gas industry, such as by means of a "dry pond". The inventive water evaporation systems and methods (1) utilize pressurized water lines to transport water from an impoundment pond or other waste water source water evaporation devices, (2) utilize pressurized air to atomize the water in the water evaporation devices by forming fine water droplets, and (3) discharge the fine water droplets into the air at high pressure from the water evaporation devices as a fine spray, cloud, or mist to maximize the rate of evaporation. The inventive water evaporation systems and method are highly efficient in evaporating large quantities of water.

A first example of a water evaporation device for use in the inventive pressurized water evaporation systems is illustrated in FIGS. 1A and 1B. The water evaporation device in this example includes a barrel 100 having a proximal receiving end 102, a distal discharge end 104, and a hollow interior extending between the proximal receiving end 102 and distal discharge end 104. The barrel 100 can have any desired outer diameter depending on the desired size of the water evaporation device. According to one embodiment, the barrel 100 can have a diameter in a range of about 1-3 inches, e.g., about 1½ inch. As will be discussed below, by passing pressurized air through the hollow interior of the barrel 100, water is atomized within barrel 100 to form fine water droplets and then discharged out the distal discharge end as a fine mist or spray.

Barrel 100 includes an air input orifice 106 at the proximal receiving end 102. The air input orifice can have any desired diameter depending on the size of the water evaporation device. According to one embodiment, the air input orifice can have a diameter of about ½ to 1 inch (e.g., ¾ inch), for example when the barrel 100 has an outer diameter of about 1½ inch. It may be advantageous for the air input orifice 106 to have a diameter corresponding to standard pipe sizes. As illustrated in FIG. 1A, the air input orifice 106 is threaded so as to provide means for coupling the receiving end 102 of the water evaporation barrel 100 to a pressurized air line (see FIG. 1C), such as by means of a threaded nipple attached to the pressurized air line. Such threads are an example of coupling means for attaching the barrel 100 to a pressurized air line, more particularly for attaching the barrel 100 to a nipple attached to the pressurized air line. Other examples of coupling means include quick release couplers known in the art. It will be appreciated that any means known in the art for coupling two pipes or hoses together may be used as the coupling means according to the invention.

In fluid communication with the air input orifice 106 is an air acceleration chamber 108. The air acceleration chamber 108 includes an input end 110 and an exit end 112. The air acceleration chamber 108 is tapered so as to become narrower going from the input end 110 to the exit end 112. This constricts the air flow pathway and causes the pressurized air to accelerate. In this embodiment, the air acceleration chamber 108 is illustrated as being frustoconical, or having a truncated cone-shaped cross section. It will be appreciated, however, that air acceleration chamber 108 can have any design in which the air flow pathway is constricted so to accelerate air moving from the input end 110 toward and through the exit end 112. For example, the air acceleration chamber 108 can alternatively be bell shaped. It may be stepped, such as by tiny concentric circular steps that decrease in diameter moving from the input end 110 to the exit end 112. Any shape that includes a constriction for accelerating air through the hollow interior of the barrel 100 is an example of air acceleration means.

The overall dimensions of the air acceleration chamber 108, including the input end 110 and exit end 122, typically depend on the overall size of the water evaporation device. According to one embodiment, such as when the input orifice 106 has a diameter of about 1 inch, the diameter of the air acceleration chamber 108 at input end 110 may also be about 1 inch, and the diameter of the air acceleration chamber 108 at exit end 112 can be about 1/16 to about ¼ inch, e.g., about 3/32 inch. In general, the diameter of the input end 110 is at least about 100% greater than the diameter of the exit end 112, preferably at least about 150% greater, more preferably at least about 200% greater, and most preferably at least about 300% greater.

As illustrated in FIG. 1A, positioned distally just beyond the exit end 112 of air acceleration chamber 108 is an air discharge passageway 118. Air discharge passageway 118 may have the same or similar diameter as exit end 112 of air acceleration chamber 108. The air discharge passageway 118 can be relatively short, such as less than about 75% of the length of the air acceleration chamber 108, preferably less than about 50%.

Air discharge passageway 118 is interposed between and fluidly interconnects air acceleration chamber 108 with an initial mixing chamber 120, which has a diameter greater than the exit end 112 of air acceleration chamber 108 and air discharge passageway 118 in order to create venturi suction within initial mixing chamber 120. In general, the diameter of mixing chamber 120 will be at least about 100% greater than the diameter of the exit end 112 of the air acceleration chamber 108.

A water input port or orifice 122 is positioned through a sidewall of barrel 100 and is in fluid communication with the initial mixing chamber 120. The water input orifice 122 can be threaded in order to provide coupling means for connecting the water evaporation barrel 100 to a water line such as, for example, a line positioned or submerged beneath the surface of a waste water impoundment pond. The diameter of the water input orifice 122 generally depends on the overall size of the water evaporation device. According to one example, such as when the barrel 100 has an outer diameter of about 1½ inch, the water input orifice 122 can have a diameter of about ¾ inch, preferably about ½ inch.

Negative pressure within the initial mixing chamber 120 produced by fast moving air passing therethrough causes initial mixing between water introduced into the mixing chamber 120 from water input port 122 and pressurized air entering the mixing chamber 120 from air acceleration chamber 108. Initial mixing chamber 120 is therefore an example of mixing means for initially mixing water and air within the hollow interior of barrel 100.

Distal to initial mixing chamber 120, and in fluid communication therewith, is a water atomization chamber 124. The diameter and length of the water atomization chamber are generally dependent on the size of the water evaporation device. According to one embodiment, such as when the barrel 100 has an outer diameter of about 1½ inch, the water atomization chamber 124 can have a diameter of about ½ inch. In general, the diameter of the water atomization chamber 124 will be at least about 100% greater than the diameter of the exit end 112 of the air acceleration chamber 108.

The water atomization chamber 124 typically has a length at least about 20% of the length of the hollow interior of the barrel 100, preferably at least about 30%, and more preferably at least about 50% of the length of the hollow interior of the barrel 100. In the case where water is introduced into the initial mixing chamber 120 under pressure, rather than by suction or negative pressure alone, the length of water atomization chamber 124 is generally longer. In the case where the outer diameter of the barrel 100 is about 1½, the water atomization chamber 124 can have a length of about 3-5 inches, e.g., about 4¼ inches.

Pressurized air and water from the initial mixing chamber 120 enter the water atomization chamber 124 at great speed and turbulence, causing churning and rapid intermixing, thereby forming fine droplets of water. The water atomization chamber 124 is an example of water atomization means for producing small droplets of water within the hollow interior of the barrel 100.

Distal to the water atomization chamber 124 is a discharge orifice 126 at the distal discharge end 104 of the barrel 100. The discharge orifice 126 can be threaded in order to provide coupling means for coupling the distal discharge end 104 of the barrel 100 to a spray nozzle. It will be appreciated that the spray nozzle may comprise any spray nozzle known in the art for emitting a spray or cloud of water into the air. According to one embodiment, such as when the barrel 100 has an outer diameter of about 1½ inch, the discharge orifice 126 can have a diameter of about 1 inch. It may be advantageous for the discharge orifice 126 to have a diameter corresponding to standard spray nozzle sizes.

Figure 1B:
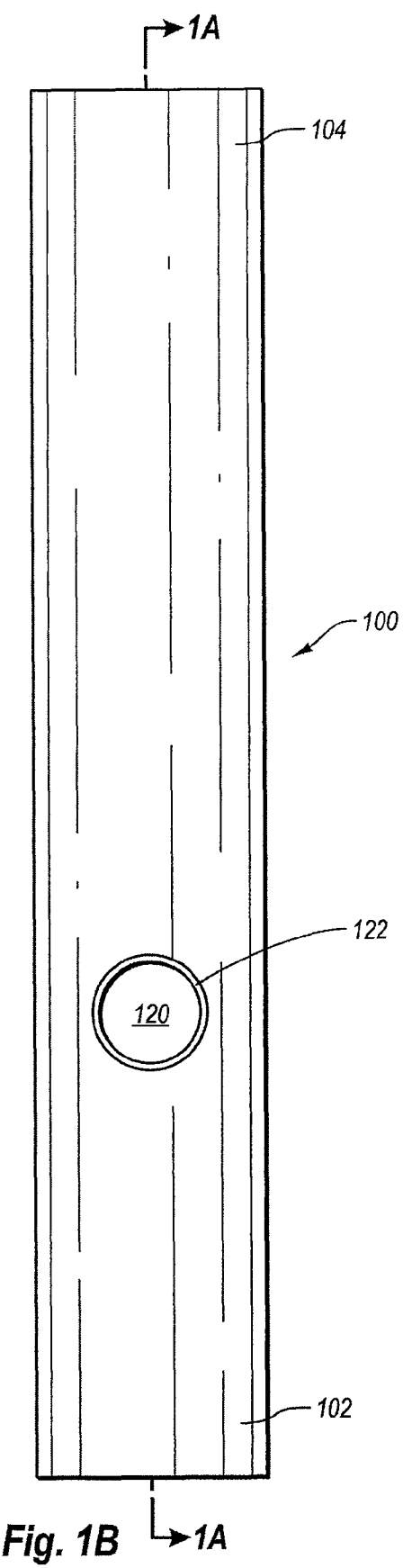
Figure 1C:
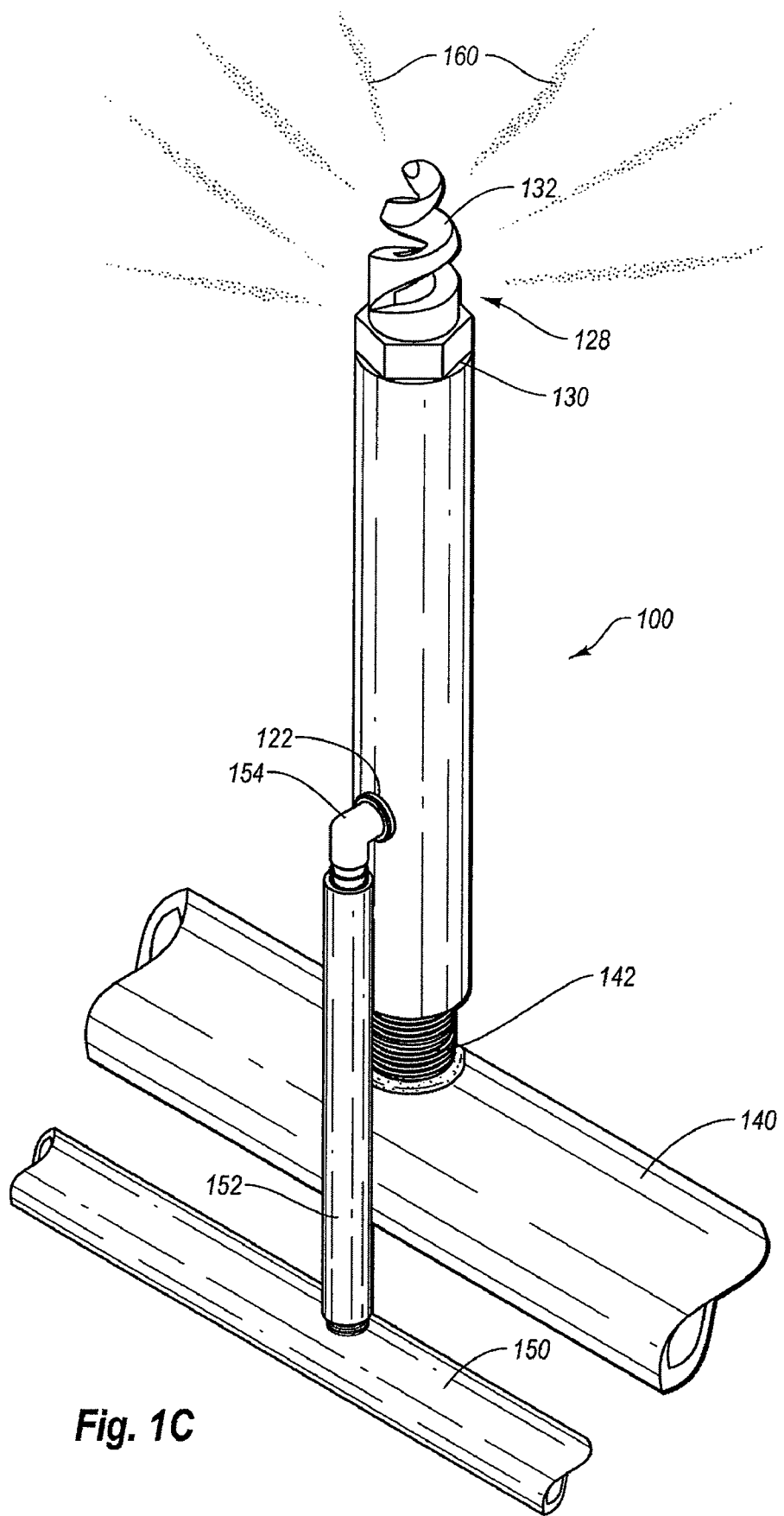
Figure 2:
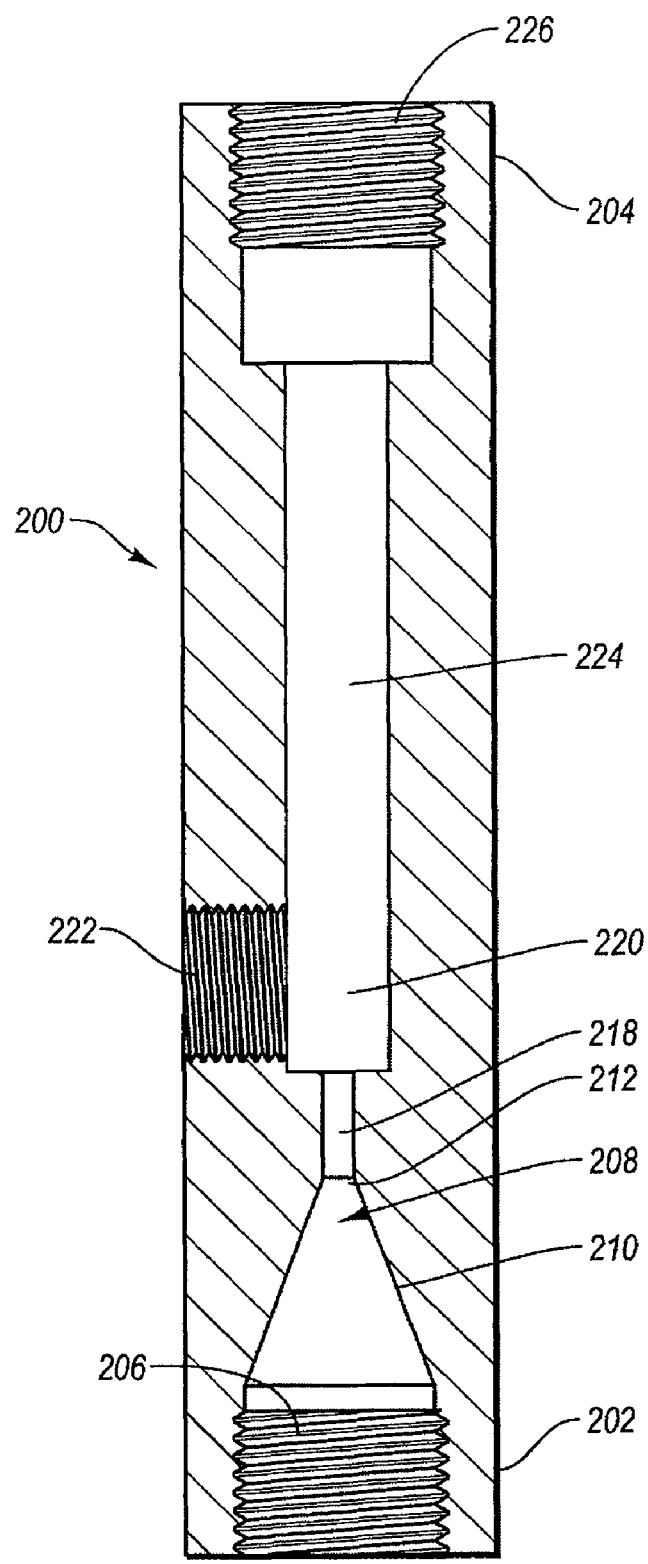
Figure 3A:
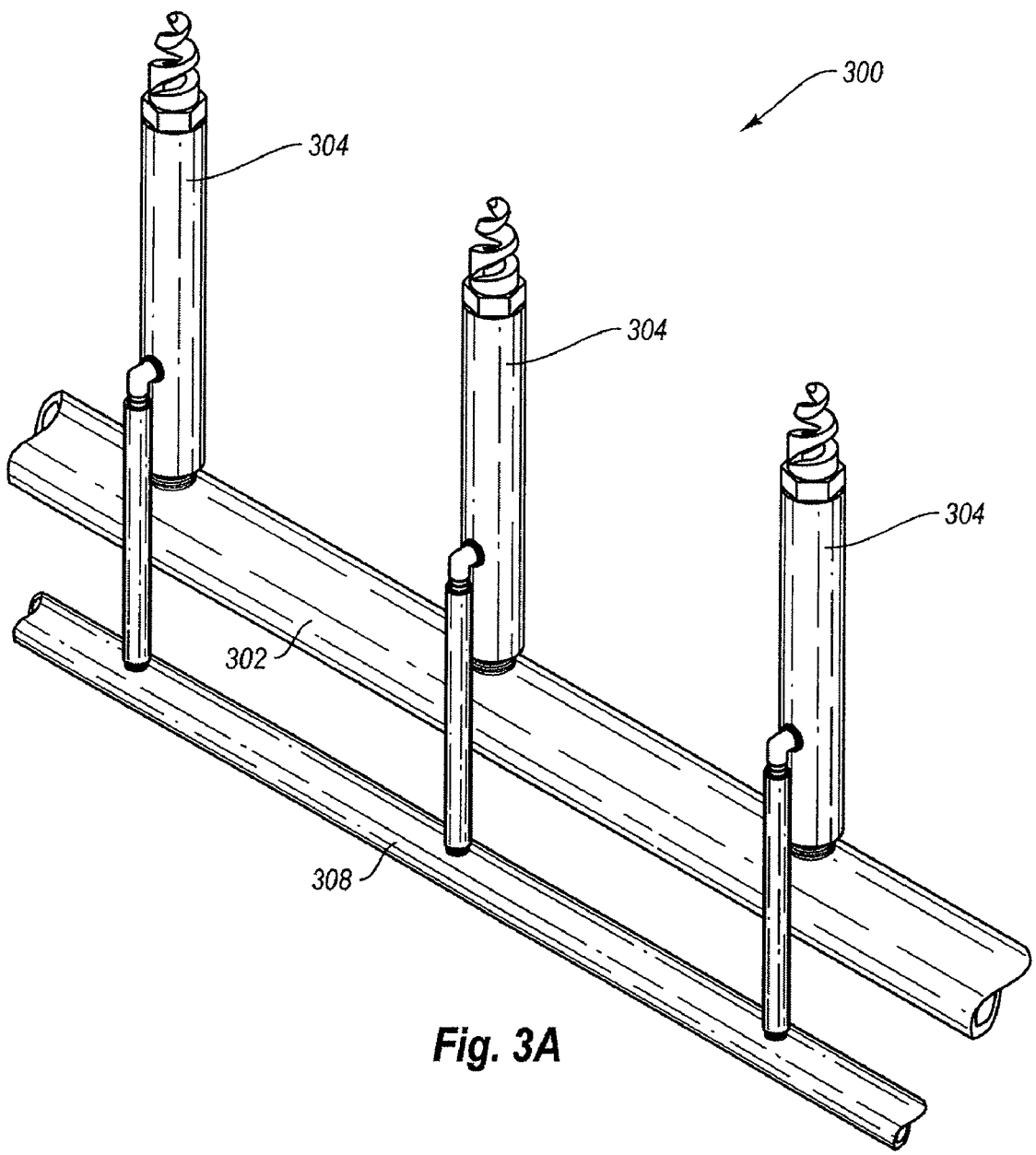
Figure 3B:
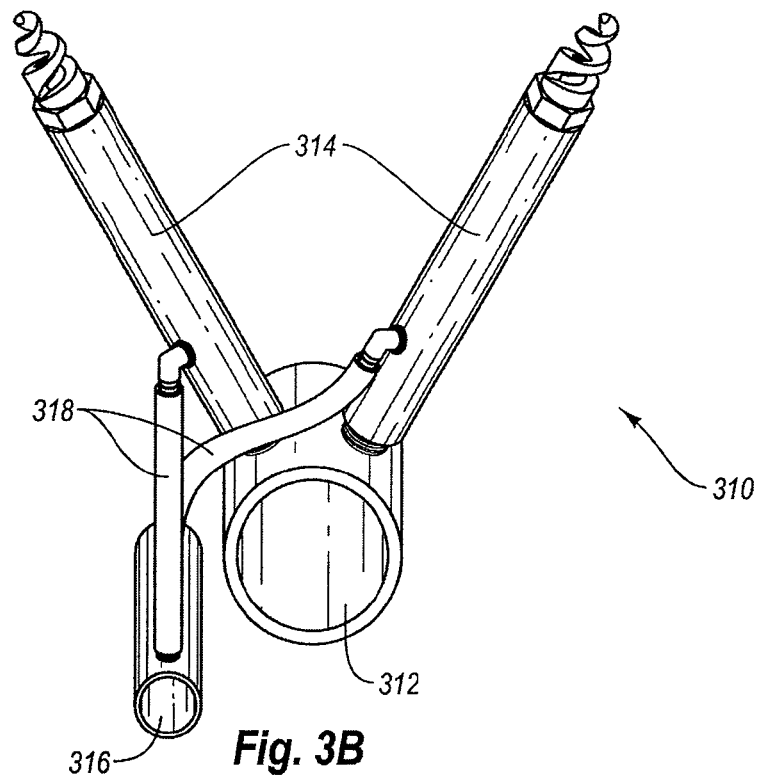
Figure 3C:
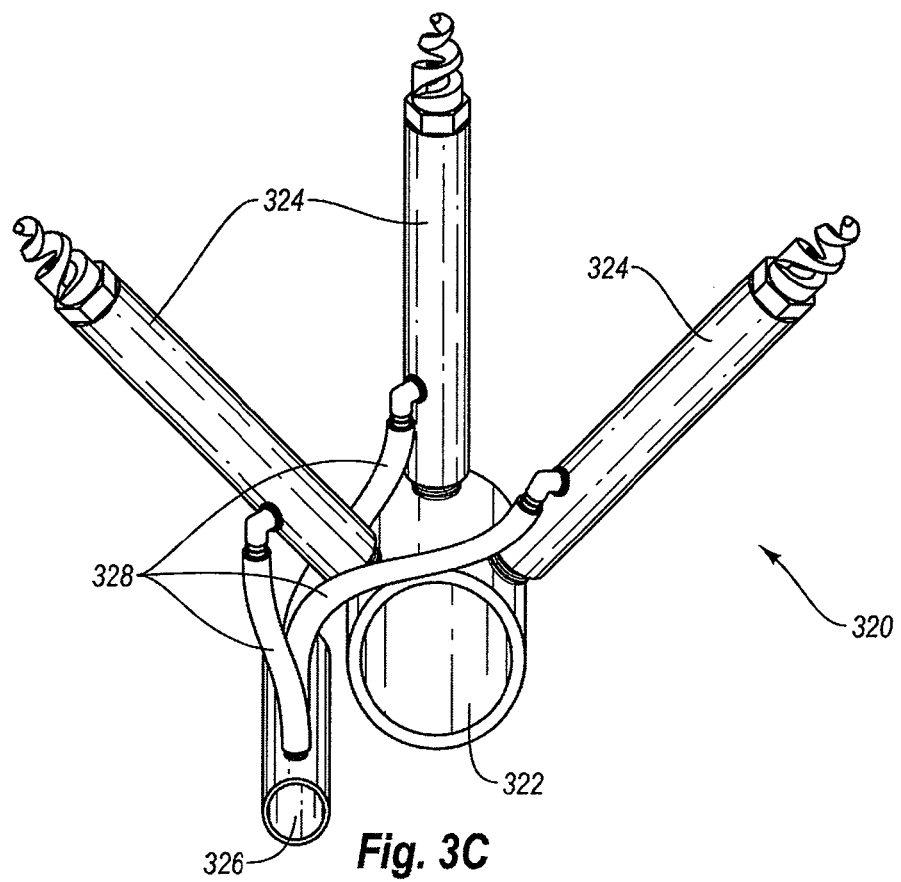

FIG. 1C is a perspective view of a pressurized water evaporation system comprised of the water evaporation barrel 100 of FIGS. 1A and 1B in combination with a pressurizable air line 140, a pressurizable water line 150, and a spray nozzle comprised of a spiral cone nozzle 128. Spiral cone nozzle 128 includes a threaded coupling end 130 that can be threadably coupled to the threaded discharge orifice 126 and a corkscrew discharge end 132 that emits a spray or a cloud of fine water droplets in a desired pattern above or external to the barrel 100. Spiral cone nozzle 128 is an example of spray means for creating a desired spray pattern of fine water droplets above or external to the barrel 100. It will be appreciated, however, that any sprayer or sprinkler known in the art may comprise the spray means.

Barrel 100 is attached to the pressurizable air line 140 by means of a nipple 142. The nipple 142 includes threads so as to threadably couple with the threaded air input orifice 106 of barrel 100. The nipple 142 can be attached to pressurizable air line 140 using any desired means, such as by welding, threaded engagement, or other attachment means known in the art. In the case where it is welded to pressurizable air line 140, the base of nipple 142 can be welded to the outer surface of air line 140. According to one embodiment, the diameter of the hole through air line 140 can be smaller than the inner diameter of nipple 142, such as less than about 75%, or 50%, or about 25% smaller than the inner diameter of nipple 142. For example, if nipple 142 has an inner diameter of about 1 inch, the hole through the air line 140 can be ¼ inch or smaller. A hole can be drilled through the air line 140 where it is desired to attach a barrel, and the nipple 142 is welded into air line 140 so as to encompass the hole.

The pressurizable water line 150 is attached to input part 122 barrel 100 by means of a pipe or tube 152 and a threaded nipple 154. The pipe or tube 152 may be attached to pressurizable water line 150 using any desired means, such as welding, threaded engagement, or other attachment means known in the art. The pipe or tube 152 may be attached to nipple 154 using any appropriate means known in the art, an example of which is a barbed sleeve (not shown) inserted within the pipe or tube 152, as is commonly used when connecting pressurized flexible sprinkler tubing to a nipple or tubing joint.

In use, pressurized air from the pressurizable air line 140 is forced through the hollow interior of water evaporation barrel 100, and pressurized water is introduced from pressurizable water line 150 into initial mixing chamber 120. From there, the pressurized water and air are introduced into the water atomization chamber 124, which causes churning or thorough mixing of the pressurized water and air so as to form fine droplets of water, which are emitted through the discharged nozzle 128 as a fine spray or mist of atomized water 160.

An alternative example of a water evaporation device is illustrated in FIG. 2. The water evaporation device in this example is similar to the one illustrated in FIGS. 1A-1C and has been shown to work well in evaporating water from a natural gas well impoundment pond using suction to draw the water into the hollow interior of the device. Nevertheless, it can be adapted to work with pressurized water evaporation systems according to the invention, such as by using as is or elongating the barrel and/or water atomization chamber. The water evaporation device of FIG. 2 includes a barrel 200 having a proximal receiving end 202, a distal discharge end 204, and a hollow interior extending between the proximal receiving end 202 and distal discharge end 204. Barrel 200 further includes an air input orifice 206 at proximal receiving end 202 which is threaded to provide means for coupling the receiving end 202 to a nipple attached to a pressurized air line (see FIG. 1C).

In fluid communication with air input orifice 206 is a tapered air acceleration chamber 208, which includes an input end 210 and an exit end 212. An air discharge passageway 218 is provided, which interconnects exit end 212 with an initial mixing chamber 220. Initial mixing chamber 220 has a diameter greater than exit end 212 and air discharge passageway 218 in order to create a negative pressure within the mixing chamber 120, such as by the venturi effect. A threaded water input orifice 222 is positioned through a sidewall of barrel 200 and is in fluid communication with the mixing chamber 220. Negative pressure within the mixing chamber 220 causes water to be drawn into the mixing chamber 220 through water input port 222 by suction or negative pressure. Alternatively, pressurized water can be introduced into mixing chamber 220 according to the invention.

Distal to the initial mixing chamber 220, and in fluid communication therewith, is a water atomization chamber 224. Pressurized air and water from mixing chamber 220 enter water atomization chamber 224 and form fine droplets of water.

Distal to water atomization chamber 224 is a threaded discharge orifice 226 at the distal discharge end 204 of barrel 200. Threaded discharge orifice 226 provides coupling means for releasably coupling the distal discharge end 204 of barrel 200 to a spray nozzle.

A pressurized water evaporation system is provided that utilizes one or more water evaporation devices or barrels as disclosed herein. As shown in FIG. 3A, an exemplary water evaporation system 300 includes a pressurizable air line 302 and a pressurizable water line 308 coupled to a plurality of water evaporation devices 304, such as those illustrated in FIGS. 1 and 2 above. In this embodiment, the water evaporation devices 304 are aligned in parallel fashion along the top of pressurizable air line 302 so as to provide a single row of water evaporation devices 304.

FIG. 3B illustrates an alternative embodiment of a water evaporation system 310 according to the invention. Water evaporation system 310 includes a pair of water evaporation devices 314 connected close together but positioned so as to project outwardly from pressurizable air line 312 at different angles. In this way, the water evaporation devices 314 spray water into the air on opposite sides of pressurizable air line 312. Pressurizable water line 316 provides pressurized water to water evaporation devices 314 via pipes or tubes 318.

FIG. 3C shows yet another embodiment of a water evaporation system 320 according to the invention. Water evaporation system 320 includes a pressurizable air line 322 and three water evaporation devices 324 positioned close together, one of which extends upward, and two of which are offset at side angles in order to emit water in three different directions relative to pressurized air line 322. Pressurizable water line 326 provides pressurized water to water evaporation devices 324 via pipes or tubes 328.

FIG. 4 illustrates a portable pressurized water evaporation system 400 that is designed to float on top of a water impoundment pond (not shown). The pressurized water evaporation system 400 includes a pair of pontoons 401 designed to float atop a water pond much like a pontoon boat. Pontoons 401 may also rest on top of a hard surface during use. Attached to pontoons 401 is a pressurizable air line 402, which is divided into a first branch 402*a* and a second branch

Figure 4:
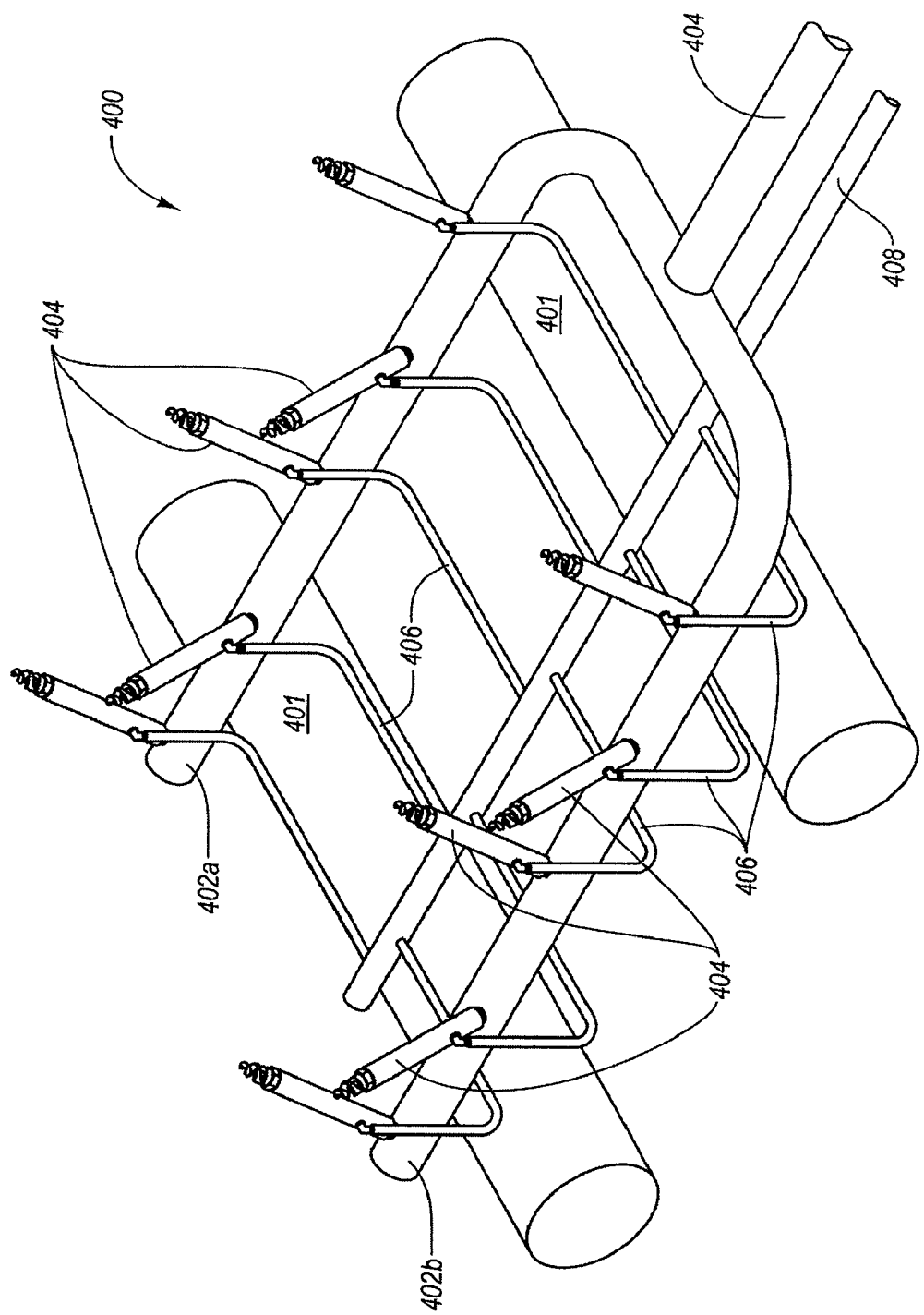

402b. Attached to each air line branch 402a, 402b, are a plurality of water evaporation devices 404. The water evaporation devices each include a water input line 406 coupled to and in fluid communication with a pressurizable water line 408. As shown in FIG. 4, the water evaporation devices 404 can be staggered by alternating angles relative to air lines 402a, 402b. This configuration provides greater separation between the individual clouds of fine water droplets in order to maximize evaporation and minimize collision and aggregation of fine water droplets into larger water drops that can fall back to the pond.

Figure 5:
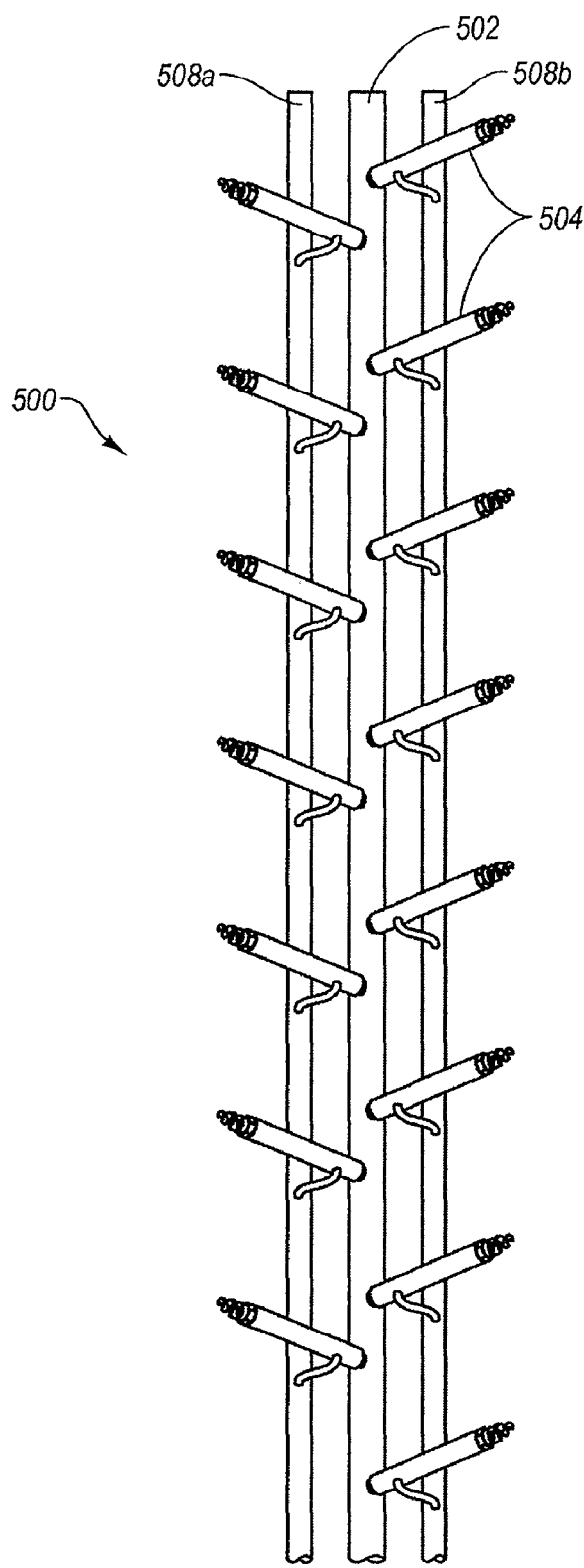

FIG. 5 illustrates another example of a pressurized water evaporation system according to the invention. More particularly, pressurized water evaporation system 500 is a non-floating fixed or portable system that includes a pressurizable air line 502 to which plurality of water evaporation devices 504 are attached in staggered fashion in order to evenly distribute the spray or mist of fine water droplets above pressurizable air line 502. Also included is a pair of pressurizable water lines 508a, 508b, which are positioned relative to the pressurizable air line 502 and evaporation devices 504 so as to feed pressurized water to corresponding staggered water evaporation devices 504. As will be discussed more fully below, pressurizable air line 502 can receive pressurized air from an air compressor, and pressurizable water lines 508a and 508b can receive pressurized water from a water pump in fluid communication with a source of waste water to be evaporated.

Figure 6:
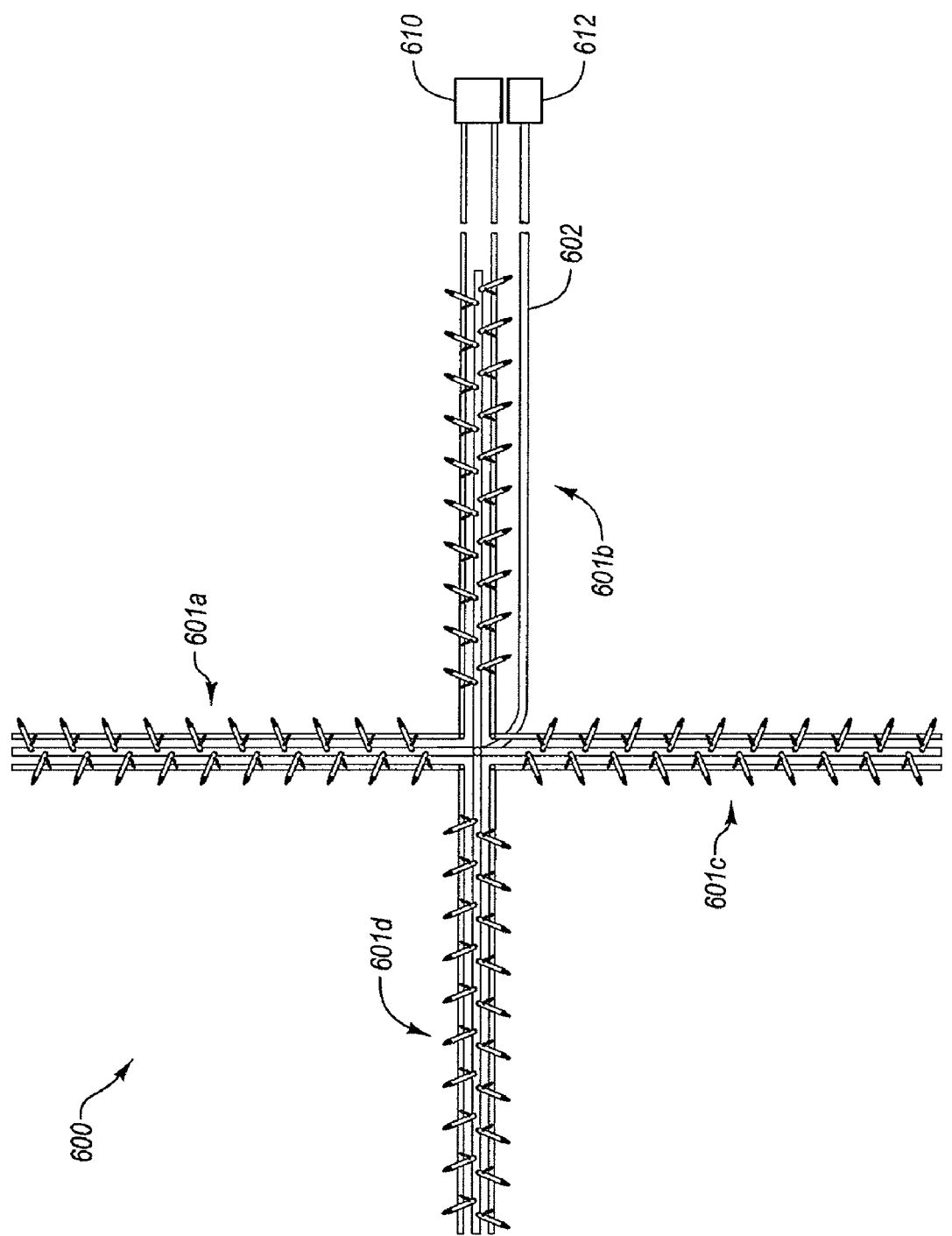

FIG. 6 illustrates an exemplary branched pressurized water evaporation system 600 for use in evaporating waste water over a large surface area. Water evaporation system 600 includes four branches 601a, 601b, 601c, 601d of pressurized water evaporation systems, such as water evaporation system 500 of FIG. 5, spaced 900 apart in order to distribute fine droplets of water for evaporation in four different quadrants or directions. A pressurizable air line 602 attached to air compressor 612 brings pressurized air to the center of branched evaporation system 600, more particularly to the pressurizable air line branches to which the water evaporation devices are fluidly connected. Similarly, pressurized water lines 608*a*, 608*b* attached to water pump 610 bring pressurized water to the pressurizable water line branches to which the water evaporation devices are fluidly connected. The length of individual branches 601*a*, 601*b*, 601*c*, 601*d* may be the same, or they may vary depending the desired shape of the spray pattern. For example, if the branched pressurized water evaporation system 600 is used in a square evaporation pond, the branches may be of equal length. Alternatively, if the evaporation pond is rectangular, two of the branches extending in opposite directions may be longer to provide a more rectangular spray pattern.

FIG. 7 illustrates a multiply branched pressurized water evaporation system 700 for use in evaporating water over an even larger surface area. Multiply branch system 700 includes branched water evaporation subsections 701*a*, 701*b*, 701*c*, 701*d*, which may consist of the branched water evaporations system 600 of FIG. 6. A pressurized air line system 702 comprised of four pressurized air line branches 702*a*, 702*b*, 702*c*, 702*d* bring pressurized air to the pressurizable air lines of each water evaporation subsection 701*a*, 701*b*, 701*c*, 701*d*. Similarly, pressurized water line system 708 comprised of water line branches 708*a*, 702*b* bring pressurized water to the pressurizable water lines of each water evaporation subsection 701*a*, 701*b*, 701*c*, 701*d*.

The branched water evaporation subsections 701*a*, 701*b*, 701*c*, 701*d* are shown positioned in four equally spaced apart quadrants in order to equally distribute fine water droplets above each of the quadrants. The water evaporation subsections 701*a*, 701*b*, 701*c*, 701*d* may alternatively be spaced apart in different configurations depending on the size and/or shape of the desired spray pattern.

FIGS. 8A and 8B illustrate an exemplary water evaporation pond that can be used in connection with pressurized water evaporation systems according to the invention. FIG. 8A is an aerial view of an exemplary "dry" water evaporation pond system 800. FIG. 8B is a cross sectional elevation view of the exemplary water evaporation pond of FIG. 8A. A "dry" pond system is characterized as having little or no water on its surface as a result of fast evaporation of water and/or drainage of water into a separate water collection pool for recirculation and/or collection of water containing dissolved solids.

Dry pond system 800 includes a water capturing depression 802 surrounded by a raised pond berm or fence 816 and a water collection pool 804 surrounded by a separate raised pool berm or fence 818. Water capturing depression 802 includes a water-proof liner 803 (FIG. 8B) upon which water and/or salts fall and collect during operation of system 800. Water collection pool 804 similarly includes a water-proof liner 805 to keep water from percolating through the bottom and sides. While the water capturing depression 802 is shown having a square configuration, it can have any desired configuration so long as it is able to capture all or substantially all of the spray emitted from pressurized water evaporation system 806 that may fall to the ground.

A fine spray or mist of water droplets is emitted over water capturing depression 802 by pressurized water evaporation system 806. Pressurized water evaporation system 806 may have any desired configuration such as, for example the multiply-branched water evaporation system 700 illustrated in FIG. 7 or the concentric ring water evaporation system 900 illustrated in FIG. 9, and discussed more fully below. Pressurized water system 806 receives pressurized air from one or more air compressors 808 and pressurized water from one or more water pumps 810. Water pump 810 is shown in fluid communication with water storage tanks 812, which contain waste water to be evaporated and may receive water recirculated from water collection pool 804. Air compressor(s) 808 and water pump(s) are advantageously positioned outside of water capturing depression 802 in order to prevent buildup of salts and water scale.

Water capturing depression 802 may be level or sloped as desired. Providing a slope causes water to run to toward a desired location, such as water collection pool 804. As seen in FIG. 8B, water capturing depression 802 includes a downward slope 819 that directs water runoff toward water collection pool 804. The slope 819 may be provided, for example by a raised side 820 opposite water collection pool 804 and a lower side 824 adjacent to water collection pool 804. A pair of slightly raised side areas 822*a*, 822*b* are raised relative to depression 826 of lower side 824 in order to help direct water into water collection pool 804 and prevent water collecting in the corners of water capturing depression 802.

A security fence 830 may be provided to prevent ingress of people or animals within the confines of water capturing depression 802 and water collection pool 804.

During use of dry water evaporation pond system 800, a fine spray or mist of water is discharged into the air above water capturing depression 802. Water that is not evaporated into the air falls down onto the liner 803 on the bottom of water capturing depression 802. To promote further evaporation, liner 803 can have a color, such as black or other dark color, designed to heat up by capturing heat energy from the sun. Depending on the temperature of the liner 803, air and/or water and the depth of water on the liner 803 water falling onto liner 803 may evaporate partially or completely. Excess water that does not evaporate flows downward along the slope 819 toward and into water collection pool 804. Salts that build up on top of liner 803 can be periodically swept or washed with water into water collection pool 804.

In the case where the waste water includes dissolved solids, such as salts, including salts and minerals having value, the water within water collection pool 804 may, over time, become increasingly concentrated with such salts or minerals. Until the total dissolved solids (TDS) within water collection pool 804 become sufficiently concentrated to warrant recovery, water from the water collection pool 804 can be recirculated back to pump 810 as part of the feed water for water evaporation system 806. When the TDS in water collection pool 804 become saturated or are sufficiently high to warrant recovery, water from water collection pool 804 may be processed using known methods to recover the TDS. For example, water from water collection pool 804 can be spread out over an evaporation surface and air dried to produce dried salt or minerals, which are then recovered using known means.

Figure 8A:
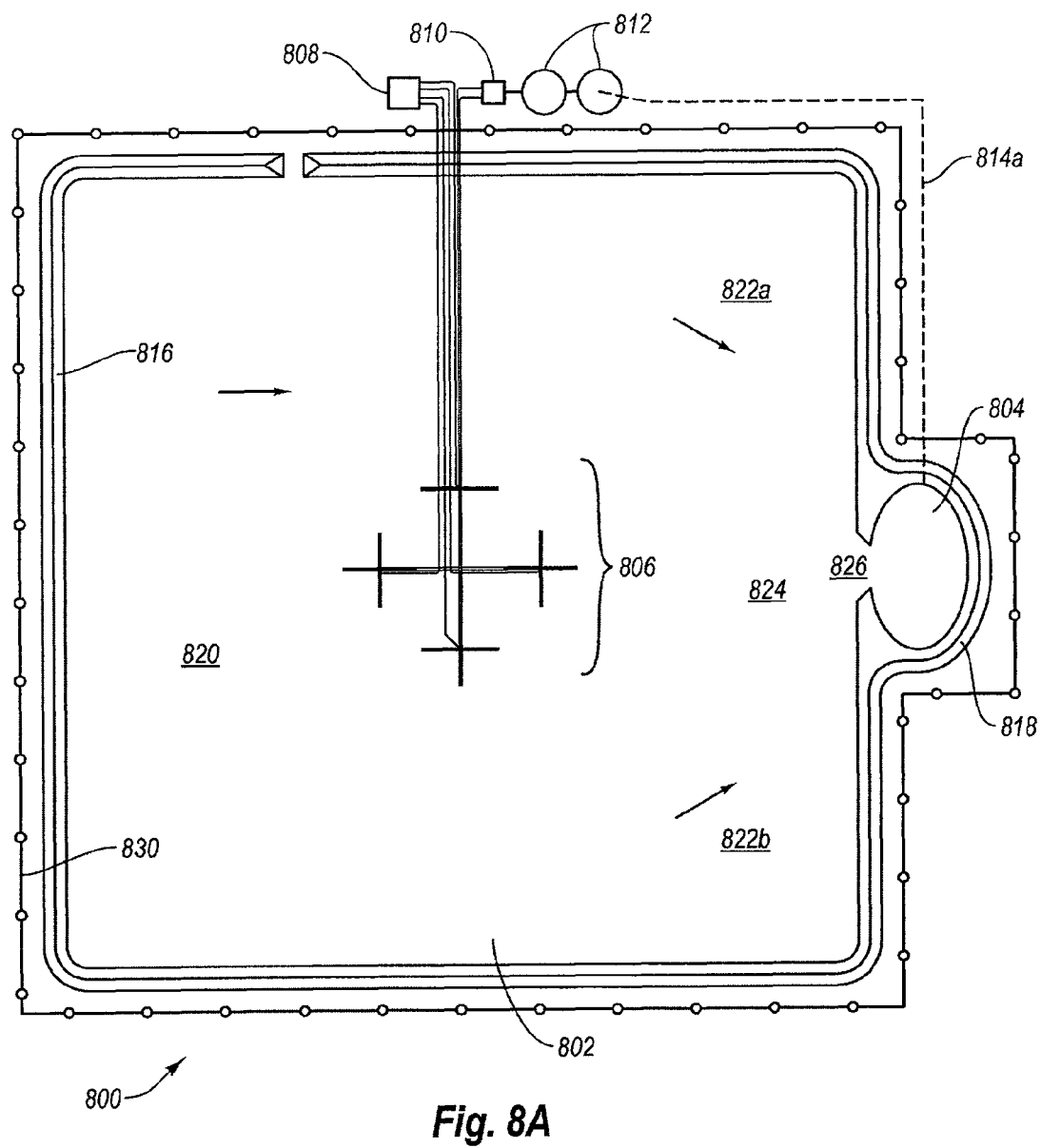
Figure 8B:
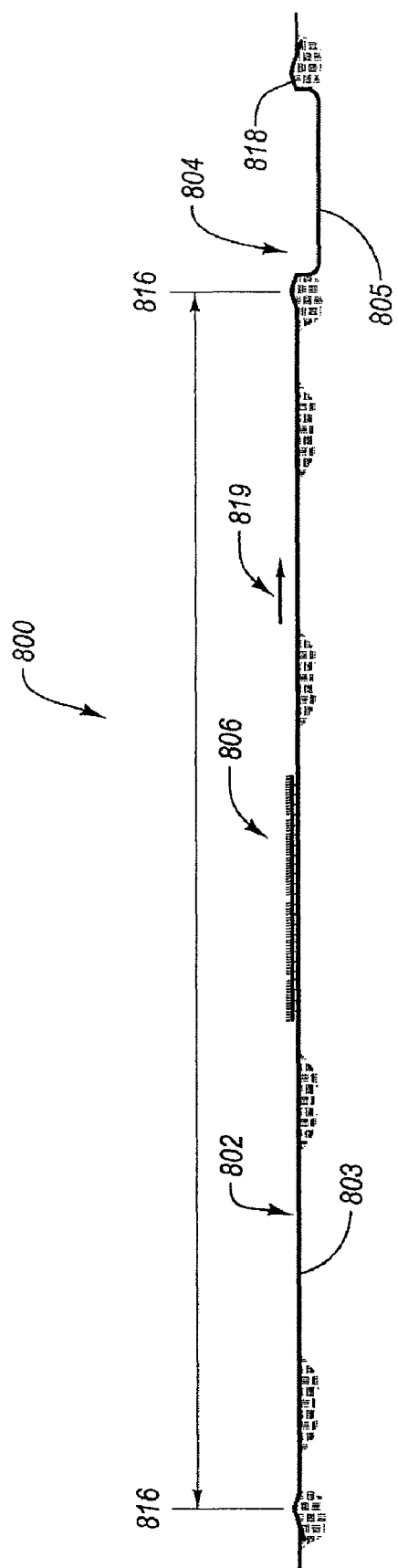
Figure 9:
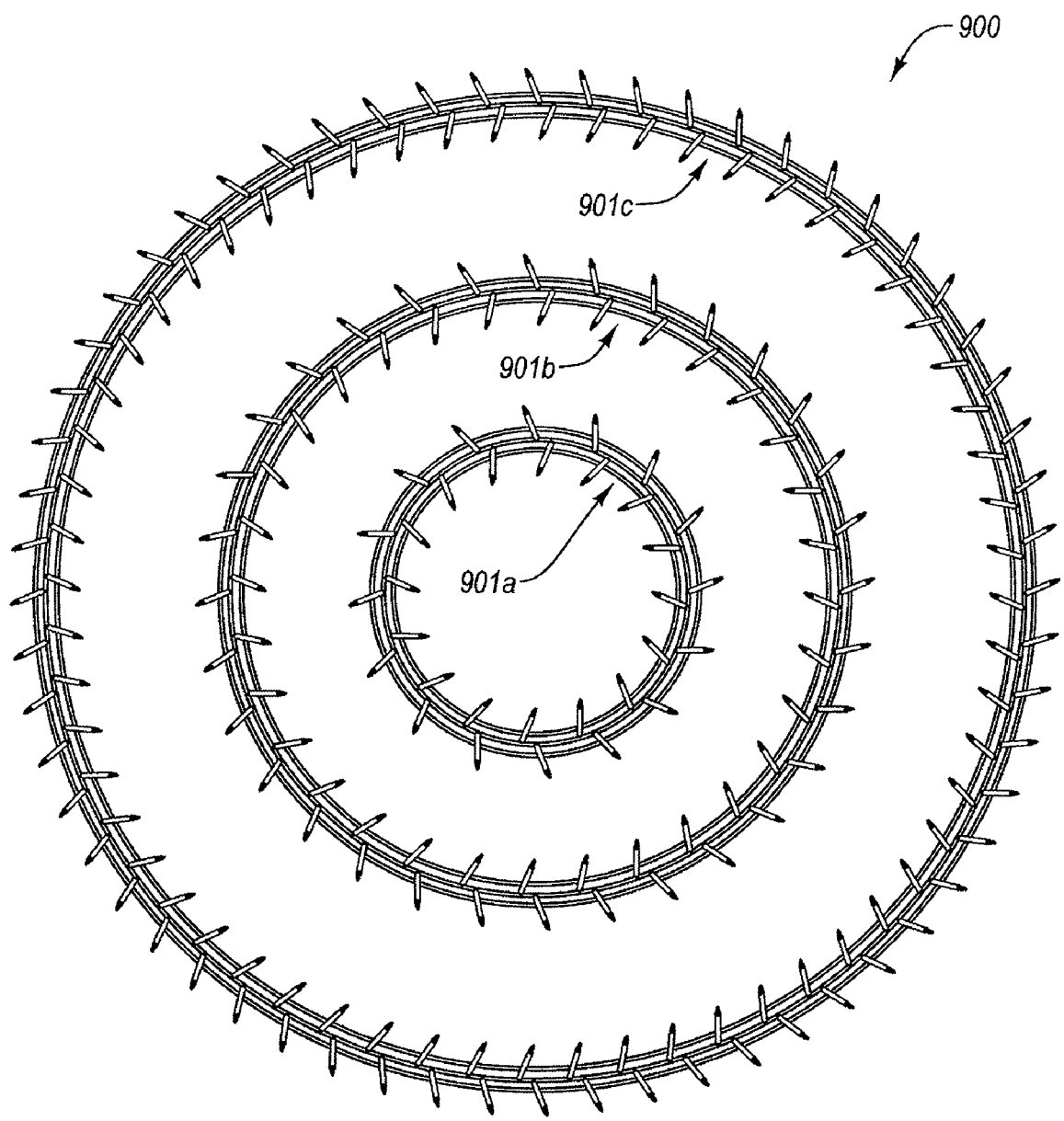

FIG. 9 illustrates another pressurized water evaporation system 900 according to the present invention, which may be used in any desired manner, such as in conjunction with a dry water evaporation pond such as the one illustrated in FIGS. 8A and 8B. Pressurized water evaporation system 900 includes multiple concentric rings 901a, 901b, 901c of pressurizable air lines, pressurizable water lines and water evaporation devices in fluid communication with the pressurizable air and water lines. The pressurized water evaporation system 900 of FIG. 9 may provide a more circular spray distribution pattern of fine water droplets compared to branched water evaporation systems and may be suitable for use with wet or dry ponds having a square or circular configuration. In addition, this system can be readily scaled up or scaled down by adding or subtracting concentric rings of the system as needed in order to expand or contract the overall diameter of the evaporation system and associated spray pattern.

Any of the foregoing pressurized water evaporation systems can be used to evaporate water from a source of waste water, such as water pumped or otherwise provided as a pressurized stream from an impoundment pond, water storage tank, or direct line from a source of industrial waste water. One method according to the invention includes (1) positioning a pressurized water evaporation system at a desired location, such as within a wet or dry pond or other defined impoundment region, (2) introducing pressurized water and air into individual water evaporation devices of the pressurized water evaporation system, (3) causing or allowing the pressurized water and air to intermix and form tiny water droplets, such as within water atomization chambers within the individual water evaporation devices, and (4) emitting a fine spray or mist of water into the air from the pressurized water evaporation system to promote evaporation of the water. The rate at which water is evaporated using the inventive pressurized water evaporation systems and methods of the invention is generally dependent on the number and spacing of water evaporation devices, the air temperature, altitude, and water temperature.

According to one method of using in the water evaporation systems according to the invention, the pressurized air introduced into the individual water evaporation devices may be heated, such as by an air compressor equipped to heat air or an auxiliary heater, in order to increase the rate of water evaporation by the system. According to one embodiment, the pressurized air may be heated to a temperature of at least about 150° F., or to a temperature of at least about 200° F., or to a temperature of at least about 250° F. The pressurized water may be also be heated to enhance evaporation, such as by means of a water pump equipped to heat water or an auxiliary water heater, to a temperature of at least about 120° F., or to a temperature of at least about 150° F., or to a temperature of at least about 180° F.

Figure 7:
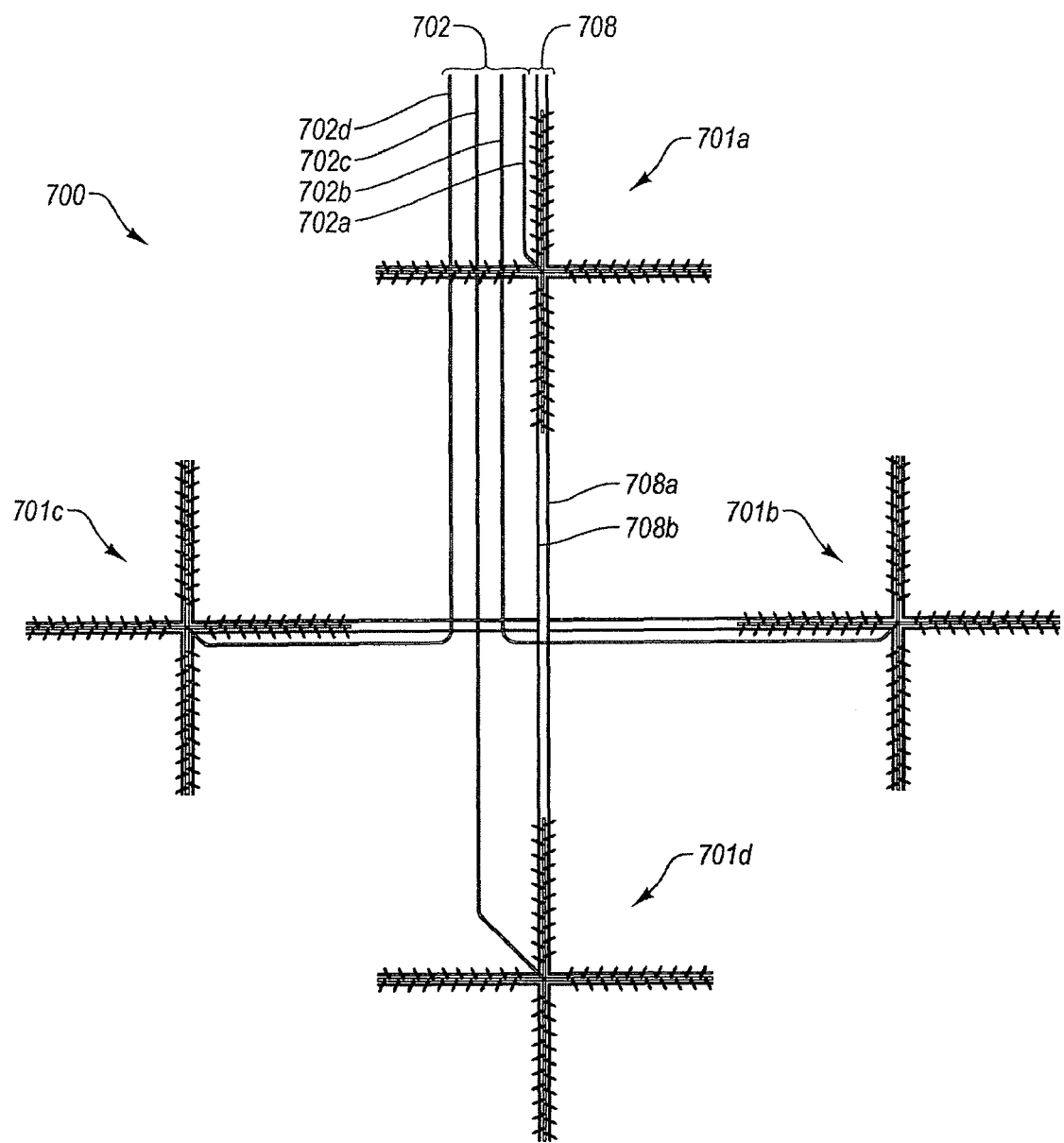

Pressurized water evaporation systems according to the invention may include any desired number of individual water evaporation devices, from as few as 1 to as many as 500 or more, and may have any desired size. For example, the water evaporation system 700 shown in FIG. 7 includes 480 water evaporation devices according to one embodiment, 120 devices in each quadrant and 30 devices along each individual branch. The water evaporation system 700 is approximately 120 feet in diameter. The pressurized water evaporation systems may advantageously include at least about 50 individual water evaporation devices, or at least about 100 water evaporation devices, or at least about 250 water evaporation devices, or at least about 450 water evaporation devices.

The dry pond water evaporation system 800 illustrated in FIG. 8 can be approximately 1 acre in size in order to reliably capture whatever water droplets or solid residues fall to the ground during the water evaporation process. It will be appreciated that the dry pond water evaporation system 800 can have any desired size, such as small as ¼ acre or as large as 16 acres. In the case where it is desirable to minimize the impact of the dry pond water evaporation system to the environment or surrounding areas, it will generally be desirable to limit the size of the dry water pond.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pressurized water evaporation system for use in evaporating water from a waste water source, comprising:
   one or more water evaporation devices, each being composed of:
      a barrel having an outer wall and a hollow interior extending longitudinally between a proximal receiving end and a distal discharge end;
      an air input orifice at the proximal receiving end of the barrel for receiving pressurized air;
      an air acceleration chamber forming part of the hollow interior of the barrel and being in fluid communication with and positioned downstream from the air input orifice, the air acceleration chamber having an input end proximal to the air input orifice and an exit end distal to the air input orifice, the exit end having a diameter that is less than a diameter of the input end;
      a water input passageway in fluid communication with and extending into the hollow interior of the barrel at a location downstream from the air acceleration chamber for receiving pressurized water;
      a water atomization chamber forming part of the hollow interior of the barrel and being in fluid communication with and positioned downstream from the air acceleration chamber and in fluid communication with the water input passageway, the water atomization chamber having a diameter greater than the diameter of the exit end of the air acceleration chamber; and a discharge orifice at the distal discharge end of the barrel through which air and water from the water atomization chamber are discharged during use;

a pressurizable air line in fluid communication with the air input orifice of each of the water evaporation devices; and a pressurizable water line in fluid communication with the water input orifice of each of the water evaporation devices.

2. A pressurized water evaporation system as in claim 1, further comprising means for releasably connecting the proximal receiving end of each water evaporation device to the pressurizable air line.

3. A pressurized water evaporation system as in claim 2, the means for releasably connecting the proximal receiving end to the pressurizable air line comprising threads within at least a portion of the air input orifice for threadable attachment to a threaded nipple attached to the pressurizable air line.

4. A pressurized water evaporation system as in claim 1, the air acceleration chamber of each water evaporation device having a frustoconical, bell-shaped or stepped cross section extending between the input end and the exit end.

5. A pressurized water evaporation system as in claim 1, the diameter of the input end of the air acceleration chamber of each water evaporation device being at least about 100% greater than the diameter of the exit end.

6. A pressurized water evaporation system as in claim 1, the diameter of the input end of the air acceleration chamber of each water evaporation device being at least about 200% greater than the diameter of the exit end.

7. A pressurized water evaporation system as in claim 1, the hollow interior further comprising an initial mixing chamber between and in fluid communication with the air acceleration chamber, the water input passageway, and the water atomization chamber.

8. A pressurized water evaporation system as in claim 1, the water atomization chamber having a length that is at least about 30% of the length of the hollow interior of the barrel.

9. A pressurized water evaporation system as in claim 1, further comprising an emitter attached at the distal discharge end of the barrel of each water evaporation device.

10. A pressurized water evaporation system as in claim 7, the initial mixing chamber and water atomization chamber both having a diameter that is greater than the diameter of the exit end of the air acceleration chamber.

11. A pressurized water evaporation system as in claim 1, further comprising a water pump in fluid communication with the pressurizable water line, the water pump being in fluid communication with at least one of a water tank, water impoundment pond, or source of industrial waste water production.

12. A pressurized water evaporation system as in claim 1, further comprising an air compressor in fluid communication with the pressurizable air line.

13. A pressurized water evaporation system for use in evaporating water from a waste water source, comprising:
one or more water evaporation devices, each being composed of:
a barrel having an outer wall and a hollow interior extending longitudinally between a proximal receiving end and a distal discharge end;
first input means for inputting pressurized air into the hollow interior of the barrel;
air acceleration means, within the hollow interior of the barrel and downstream from the proximal receiving end, for accelerating air received into the barrel through the proximal receiving end;
second input means for inputting pressurized water into the hollow interior of the barrel at a location downstream from the air acceleration means;
water atomization means, within the hollow interior of the barrel in fluid communication with the second input means and downstream from the air acceleration means, for mixing the pressurized water with the pressurized air and forming fine droplets of water; and
spray means, at the distal discharge end of the barrel, for directing fine droplets of water from the water atomization means into the air above or external to the barrel;
air pressurizing means, in fluid communication with the first input means of each water evaporation device, for pressurizing air to be introduced into the barrel of each water evaporation device; and
water pressurizing means, in fluid communication with the second input means, for pressurizing water to be introduced into the barrel of each water evaporation device.

14. A pressurized water evaporation system as in claim 13, the first input means comprising an air input orifice at the proximal receiving end of the barrel.

15. A pressurized water evaporation system as in claim 13, the second input means comprising a water input orifice through a side of the outer wall of the barrel and in fluid communication with the hollow interior of the barrel.

16. A pressurized water evaporation system as in claim 13, wherein pressurized water evaporation system comprises at least about 50 water evaporation devices.

17. A pressurized water evaporation system for use in evaporating water from a waste water source, comprising:
one or more water evaporation devices, each being composed of:
a barrel having an outer wall and a hollow interior extending between a proximal receiving end and a distal discharge end;
an air input orifice at the proximal receiving end of the barrel for receiving pressurized air;
an air acceleration chamber forming part of the hollow interior of the barrel and in fluid communication with the air input orifice, the air acceleration chamber having an input end proximal to the air input orifice and an exit end distal to the air input orifice, the exit end and having a diameter that is less than a diameter of the input end;
a water input orifice formed through the outer wall of the barrel and in fluid communication with the hollow interior of the barrel at a location downstream from the air acceleration chamber for receiving pressurized water;
a water atomization chamber forming part of the hollow interior of the barrel and being in fluid communication with and positioned downstream from the air acceleration chamber and in fluid communication with the water input orifice, the water atomization chamber having a diameter greater than the diameter of the exit end of the air acceleration chamber;
a discharge orifice at the distal discharge end of the barrel through which air and water from the water atomization chamber are discharged; and
a spray nozzle in fluid communication with the discharge orifice for emitting a fine spray or mist of water into the air;
one or more pressurized air lines in fluid communication with the air input orifice of the one or more water evaporation devices;

an air compressor that provides pressurized air to the one or more pressurized air lines;

one or more pressurized water lines in fluid communication with the water input orifice of the one or more water evaporation devices; and a water pump that provides pressurized water to the one or more pressurized water lines.

18. A method of evaporating water from a source of waste water, comprising:

providing a water evaporation system comprising:

a pressurized water evaporation system for use in evaporating water from a waste water source, comprising:

one or more water evaporation devices, each being composed of:

a barrel having an outer wall and a hollow interior extending between a proximal receiving end and a distal discharge end;

an air input orifice at the proximal receiving end of the barrel for receiving pressurized air;

an air acceleration chamber forming part of the hollow interior of the barrel and in fluid communication with the air input orifice, the air acceleration chamber having an input end proximal to the air input orifice and an exit end distal to the air input orifice, the exit end having a diameter that is less than a the diameter of the input end;

a water input orifice formed through the outer wall of the barrel and in fluid communication with the hollow interior of the barrel at a location downstream from the air acceleration chamber for receiving pressurized water;

a water atomization chamber forming part of the hollow interior of the barrel and being in fluid communication with and positioned downstream from the air acceleration chamber and in fluid communication with the water input orifice, the water atomization chamber having a diameter greater than the diameter of the exit end of the air acceleration chamber;

a discharge orifice at the distal discharge end of the barrel through which air and water from the water atomization chamber are discharged; and a spray nozzle in fluid communication with the discharge orifice for emitting a fine spray or mist of water into the air;

one or more pressurized air lines in fluid communication with the air input orifice of the one or more water evaporation devices;

an air compressor that provides pressurized air to the one or more pressurized air lines;

one or more pressurized water lines in fluid communication with the water input orifice of the one or more water evaporation devices;

and a water pump that provides pressurized water to the one or more pressurized water lines;

introducing pressurized air through the one or more pressurized air lines and into the one or more water evaporation devices;

introducing pressurized water through the one or more pressurized water lines and into the one or more water evaporation devices;

forming fine droplets of water within the water atomization chamber of the one or more water evaporation devices; and discharging a spray or cloud of fine water droplets out the spray nozzle of each water evaporation device.

19. A method as in claim 18, the water pump being in fluid communication with at least one of a water tank, water impoundment pond, or source of industrial waste water production.

20. A method as in claim 18, the water comprising waste water produced by or obtained from an oil or gas well.

* * * * *

UNITED STATES PATENT AND TRADEMARK OFFICE
CERTIFICATE OF CORRECTION

| | | |
|---|---|---|
| PATENT NO. | : 8,173,026 B2 | Page 1 of 2 |
| APPLICATION NO. | : 12/404071 | |
| DATED | : May 8, 2012 | |
| INVENTOR(S) | : Rasmussen et al. | |

It is certified that error appears in the above-identified patent and that said Letters Patent is hereby corrected as shown below:

On the Title Page item (57), Abstract
Line 11, change "waster" to --waste--

In the Drawings:
Sheet 6, replace Figure 4 with the figure depicted below, wherein the reference number 404 in the bottom right-hand corner was replaced with the correct reference number of 402

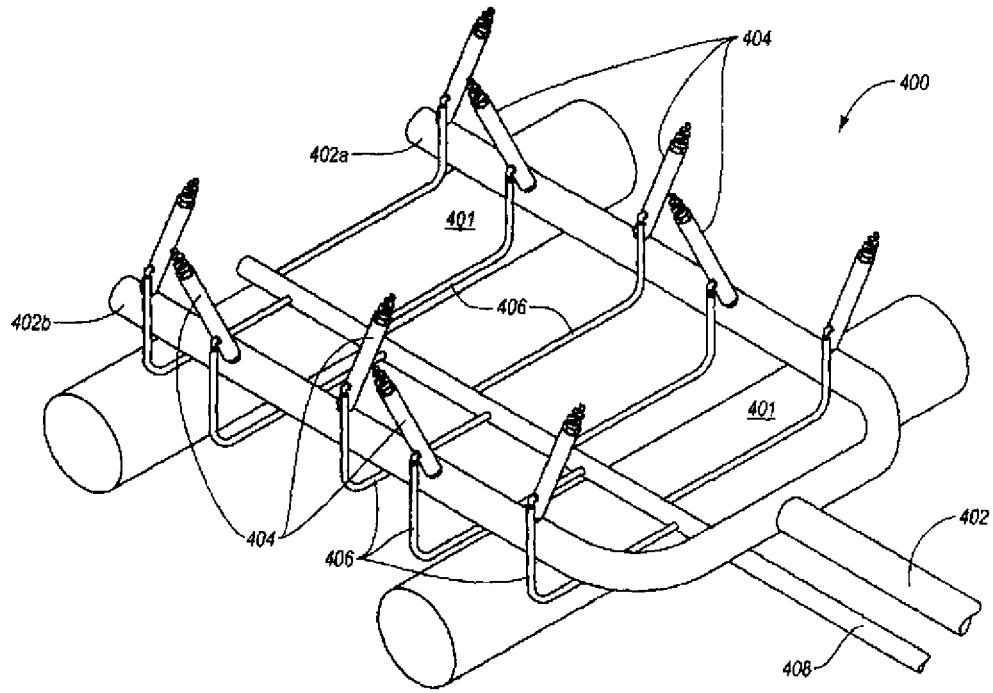

Fig. 4

Signed and Sealed this
Second Day of July, 2013

Teresa Stanek Rea
*Acting Director of the United States Patent and Trademark Office*

CERTIFICATE OF CORRECTION (continued)
U.S. Pat. No. 8,173,026 B2

<u>In the Specifications:</u>

<u>Column 2</u>
Line 10, change "provided" to --provided,--

<u>Column 3</u>
Line 8, change "chum" to --churn--

<u>Column 4</u>
Line 20, change "alone" to --along--
Line 24, change "so as" to --so as to--

<u>Column 5</u>
Line 42, change "so to accelerate" to --so as to accelerate--

<u>Column 9</u>
Line 34, change "spaced 900 apart" to --spaced apart--

<u>Column 10</u>
Line 39, change "water" to --water 814a--

<u>In the Claims:</u>

<u>Column 15</u>
Line 25, change "than a the" to --than the--